United States Patent [19]

Eguchi et al.

[11] 4,437,391
[45] Mar. 20, 1984

[54] AIR CONDITION CONTROL APPARATUS WITH INDOOR AND OUTDOOR AIR SELECTION MODES FOR AUTOMOBILES

[75] Inventors: Osamu Eguchi, Anjo; Tomonori Fukui, Kariya, both of Japan

[73] Assignee: Nippondenso Co., Ltd., Kariya, Japan

[21] Appl. No.: 326,414

[22] Filed: Dec. 1, 1981

[30] Foreign Application Priority Data

Dec. 2, 1980 [JP] Japan .................... 55-170716

[51] Int. Cl.³ .................... B60H 1/00; B60H 3/00
[52] U.S. Cl. .................... 98/2.01; 165/16; 165/42; 165/43; 236/49; 364/148; 364/424
[58] Field of Search ........ 165/11, 13, 14, 42, 165/41, 43, 16, 28, 12; 236/49; 364/424, 505, 148; 98/2.01, 2.11

[56] References Cited

U.S. PATENT DOCUMENTS

| | | | |
|---|---|---|---|
| 4,164,172 | 8/1979 | Anderten et al. | 165/16 |
| 4,259,722 | 3/1981 | Iwata et al. | 165/42 |
| 4,289,195 | 9/1981 | Bellot et al. | 165/16 |
| 4,352,321 | 10/1982 | Fukui et al. | 165/16 |

FOREIGN PATENT DOCUMENTS

| | | | |
|---|---|---|---|
| 2720739 | 11/1978 | Fed. Rep. of Germany | 236/49 |
| 2903643 | 8/1980 | Fed. Rep. of Germany | 165/28 |
| 47-36974 | 9/1972 | Japan. | |
| 53-126645 | 11/1978 | Japan | 98/2.01 |

Primary Examiner—William R. Cline
Assistant Examiner—John K. Ford
Attorney, Agent, or Firm—Cushman, Darby & Cushman

[57] ABSTRACT

In an air conditioning system for an automobile the indoor-outdoor air change-over door is controlled by a noxious gas sensor in the outdoor air. The output signal of the gas sensor is compared by a microcomputer to a reference signal which is determined by the minimum value of the output signal of the gas sensor produced from the time when the gas sensor is energized to the time when it is deenergized. The microcomputer outputs a signal causing an actuator to move the change-over door from the outdoor air introduction mode to the indoor air recirculation mode when the difference between the output signal of the gas sensor and the reference level exceeds a predetermined amount.

5 Claims, 4 Drawing Figures

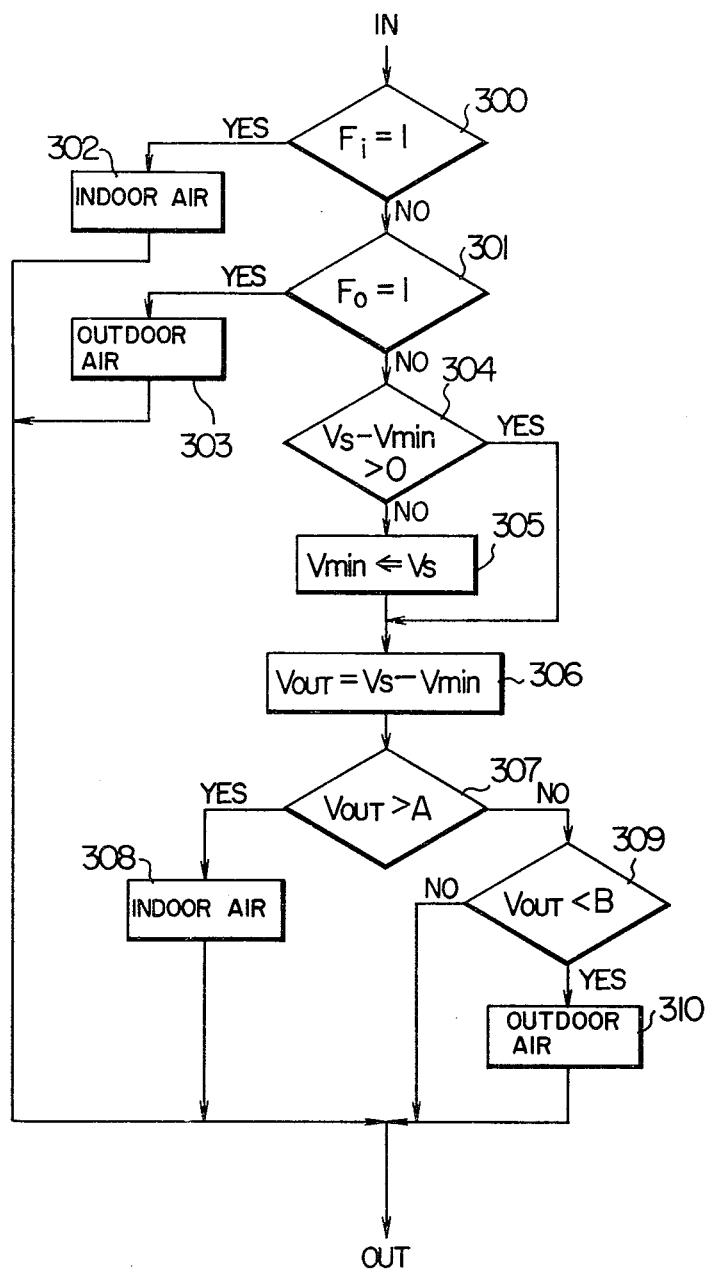

AIR CONDITION CONTROL APPARATUS WITH INDOOR AND OUTDOOR AIR SELECTION MODES FOR AUTOMOBILES

BACKGROUND OF THE INVENTION

The present invention relates to an air-condition controlling apparatus for automobiles for automatically changing the air conditioning state between internal air circulation and intake of outdoor air in an air conditioner.

It has been well known from Japanese Patent Publication No. 47-36974, that a conventional control unit includes an air conditioning unit in which the upstream side is selectively connected to the outside of the automobile and the downstream side is connected to the inside of the automobile, an operating unit for selecting the intake of air from the outside of the automobile and from the inside of the automobile within the air conditioning unit, and a detector for generating an electrical signal in accordance with impurity components included in the outside air of the automobile, said operating unit being set by a controller to a state of internal air circulation (the state of taking in air from inside the automobile) in accordance with the electrical signal of said detector.

However, the well-known prior art makes clear only the fact that the state of air intake from the outside of the automobile is changed over to the state of internal air circulation when the electrical signal of said detector shows a larger value than a predetermined value. In order to achieve more desirable practical applications, however, detection must be carried out by taking into consideration temperature and humidity characteristics of said detector and time change, etc.

When a gas detector is to be used as a detecting means, a gas detector of solid heat conduction type can be considered proper for use in an automobile, upon considering structure, price, etc. among various types of gas detectors to which a semi-conductor and other systems are applied. A gas detector of this type utilizes such an operating principle that when a metal oxide semiconductor such as $SnO_2$ or the like is heated within the range of about 300° C. to 500° C. so that inflammable gas is absorbed in the semiconductor, the thermal conductivity of the semiconductor becomes larger to improve heat discharge thereby lowering the temperature of the semiconductor and reducing the resistance of a platinum wire for heating the semiconductor.

The present inventors carried out an experiment to check to see to what extent a deviation voltage would occur at a gas detector forming one leg of a bridge circuit when an automobile is run in a town with said gas detector disposed at an outdoor air inlet path in order to detect the degree of impurity of air outside the automobile. As a result of this experiment, the size of deviation voltage was very small with approximately 50 mV as a maximum, although the value may depend on the area in which the automobile runs. On the other hand, when the humidity characteristics of said gas detector changed from the absolute humidity of 1 $g/m^3$ to 100 $g/m^3$, deviation voltage was as high as approximately 50 mV, and further the voltage change of approximately 10 mV was observed due to the change of time. It was made clear that this detector cannot be expected to carry out desirable operation as a control unit according to the simple detection method as shown in said prior art.

SUMMARY OF THE INVENTION

Accordingly, in the light of the above problem, it is an object of the present invention to provide a control unit which can stably operate without any erroneous operation owing to the temperature, humidity and time change of said gas detector change, by comparing the output of the detector with a reference level which is the minimum value of said gas detector observed during the period from the time when a voltage is applied to the gas detector to the time when it is disconnected.

BRIEF DESCRIPTION OF THE DRAWINGS

This invention will be apparent from the following description taken in conjunction with the accompanying drawings, in which:

FIG. 3 is a flow chart showing the details of the main part of FIGS. 2a and 2b.

DETAILED DESCRIPTION OF THE PREFERRED EMBODIMENTS

Figure 1:
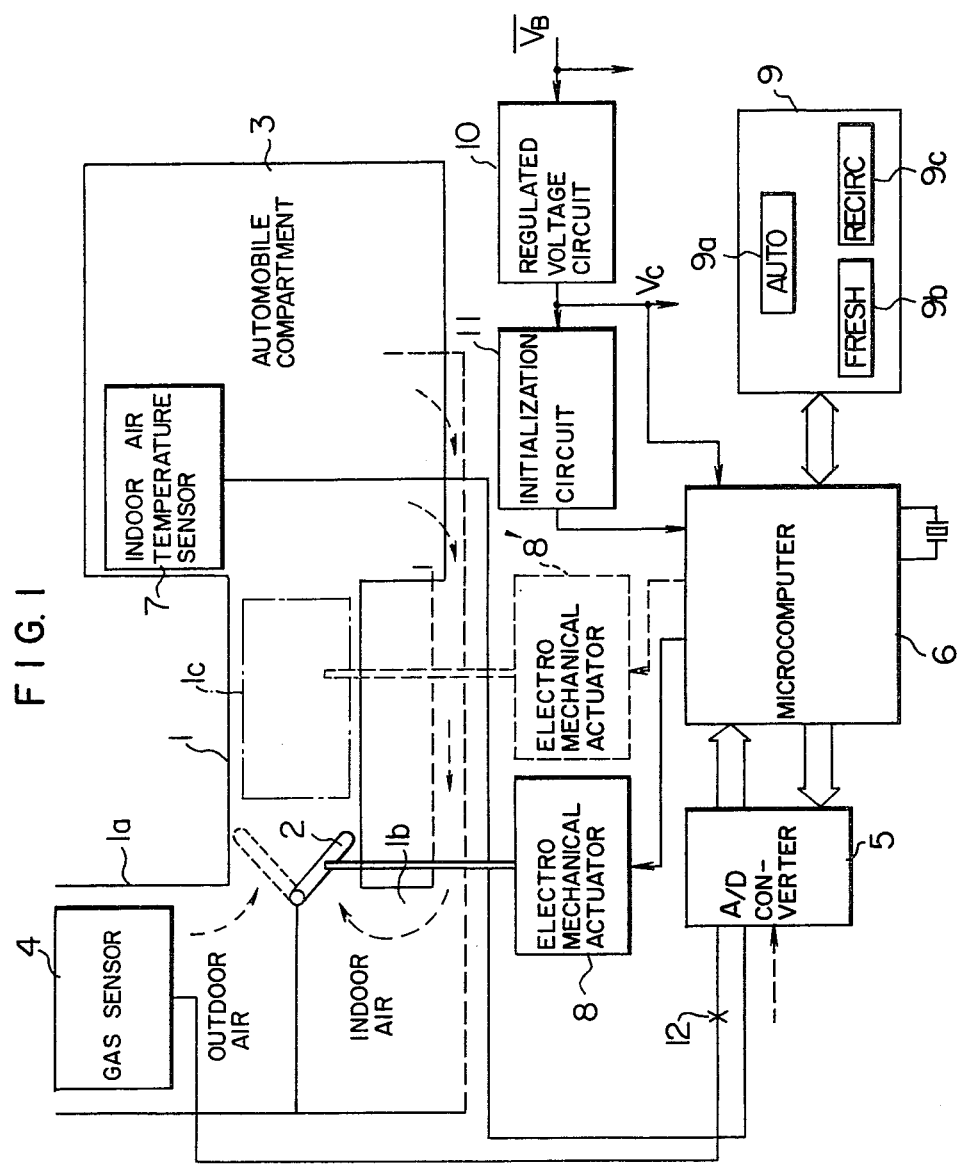
FIG. 1 is an overall block diagram showing one embodiment of the present invention.

FIG. 1 is an overall block diagram showing the device of the present invention built into an automatic air conditioner which is controlled by a microcomputer.

Numeral 1 denotes a duct of the car air conditioner disposed in the car. It takes in outdoor air from an outdoor air inlet 1a and takes in indoor air from an indoor air inlet 1b and circulates it.

Numeral 2 denotes a damper for changing over between indoor and outdoor air. It selectively switches the outdoor air inlet 1a and the indoor air inlet 1b to open them so as to change over between the outdoor air inlet and the indoor air circulation. The duct 1 has an adjusting unit 1c which includes a blower for sending air, an evaporator for cooling the air sent, a heater core for heating the air sent and an air mixing damper for adjusting the proportion of heating and cooling air, which are not shown. Temperature is adjusted by changing the mixture of cold air and hot air so as to control the air condition within an automobile compartment 3.

Numeral 4 denotes a gas detector (hereinafter referred to as a gas sensor) disposed in the outdoor air inlet path 1a, for sensing the density of noxious gas included in the air outside the automobile and generating an analog signal in accordance with the density. The density is read by a microcomputer 6 through an A/D converter 5. The A/D converter 5 has, for example, an indoor air temperature sensor 7 relating to the automatic air conditioner and a multiplexer function for sequentially converting analog signals such as from an outdoor air temperature sensor or the like (not shown) into digital values and supplying the data to the computer 6. An instruction for which analog input to be A/D converted is provided from the microcomputer 6 to the A/D converter 5. A well-known heat transmission method using a metal oxide semiconductor such as $SnO_2$ or the like is employed for the gas sensor 4 so that the resistance value may change by the adhesion of inflammable gas. It is needless to mention that a gas sensor of other components may also be used.

Numeral 8 denotes an electro-mechanical actuator for operating the damper 2 for changing over between indoor and outdoor air. A diaphragm actuator that is operated by vacuum produced by an engine, for instance, is used for this actuator 8 to set the damper 2 usually at the state of taking in outdoor air and setting it to the state of taking in air from the inside of the automobile compartment when it is energized with the actuator operating control signal being applied from the latched output port of the microcomputer 6. The electro-mechanical actuator 8 is provided for operating the adjusting unit 1c. It is controlled based on the automatic air conditioning processing of the microcomputer 6.

Numeral 9 denotes an operation switch and display unit of the automatic air conditioner, and 9a a switch and display unit for indicating the operation of the automatic air conditioner and the operation of the automatic indoor and outdoor air change-over unit. When this switch is depressed, an internal illuminating lamp is lighted to let the driver or passenger of the automobile to know that the automatic mode is set. Similarly, 9b denotes an outdoor air inlet switch and display unit and 9c denotes an indoor air circulation switch and display unit. An automatic return type switch employing a spring is used for each switch and the instruction signal of each switch is read periodically by the microcomputer 6.

Numeral 10 denotes a regulated voltage circuit, which receives a power source voltage $V_B$ from the automobile-loaded battery when the key switch of the automobile is turned on and generates a constant stable voltage $V_C$.

Numeral 11 denotes an initialization circuit, which generates a start signal for starting the program processing of the microcomputer 6 from the initial address based on the build-up of the stable voltage $V_C$.

Figure 2A:
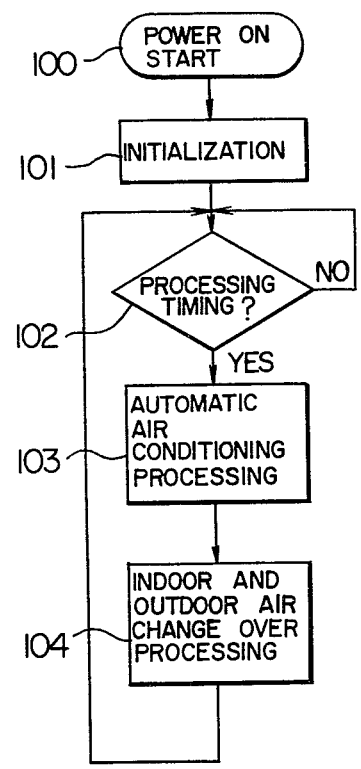
FIGS. 2a and 2b are flow charts showing the outline of a microcomputer control program in FIG. 1.
Figure 2B:
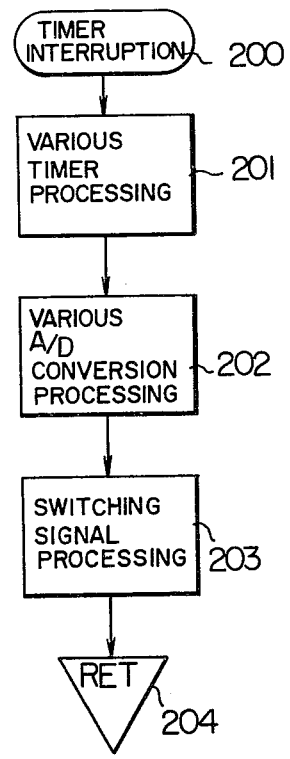

FIGS. 2a, 2b and FIG. 3 show control programs of the part relating to the present invention among the arithmetic processings executed by the microcomputer 6.

When the key switch of the automobile is turned on, a power $V_B$ is supplied to the control unit shown in FIG. 1, and the microcomputer 6 starts the execution of the control program from a step 100 of the main control routine shown in FIG. 2a. In a step 101, the maximum value to be handled by the microcomputer 6 (FF in hexadecimal notation when an 8-bit microcomputer is used) is set as the minimum or lowest value of the gas sensor output signal and arithmetic variables necessary for other controls are initialized.

In a step 102, decision is made whether the arithmetic processing timing at every constant cycle has been reached. When the result of the decision is YES, an automatic air conditioning processing routine 103 and an indoor and outdoor air change-over processing routine 104 are executed sequentially. Both of these processings are executed in a constant cycle of about several 100 ms. The automatic air conditioning processing 103 is carried out by controlling the adjusting unit 1c in accordance with the signals of the indoor air temperature sensor 7 and other temperature sensors and setting devices not shown, so that the air conditioning in the car cabin 3 is controlled. Since detailed contents of the automatic air conditioning processing 103 are not the object of the present invention, the detailed explanation will be omitted. Details of the indoor and outdoor air change-over processing 104 are shown in FIG. 3.

The microcomputer 6 executes the main control routine shown in FIG. 2a and executes the timer interrupt routine shown in FIG. 2b in the cycle of approximately 10 ms. To be more specific, each time when the count value of the counter incorporated in the computer 6 reaches a value equivalent to the predetermined value of about 10 ms, the arithmetic processing of the main control routine is suspended temporarily and the timer interrupt processing is executed, upon termination of which the processing of the main control routine is returned again.

In the timer interrupt processing, when a processing instruction is received from the internal counter in a step 200, the program address of the main control routine is stored in the save register, and each routine of timer processing 201, A/D convertion processing 202 and switch signal processing 203 is executed. In a step 204, the program address saved in the save register is read and the execution of the main control routine is restarted.

In the timer processing routine 201, each time a timer interrupt is executed, a timer counter $T_0$ set to the memory of the computer 6 is increased, and the count value is used to decide whether the predetermined value has been reached in the decision step 102. The timer counter $T_0$ is so designed as to return the count value to 0 when the predetermined value has been reached and a further increment is made.

It may be so designed in the A/D conversion processing routine 202 that an instruction is sent to the A/D converter 5 to selectively convert the analog signals from each of the sensors 5 and 7 into digital signals and to store the digital value obtained in the predetermined memory address of the computer 6. In order to prevent the occurrence of noise, an average value may be obtained from several digital values.

In the switch signal processing routine 203, the turn-on state of each switch is checked sequentially from the operating switch and display unit 9. When there is an indication signal of a first switch (9a), arithmetic variables (flags) $F_1$ and $F_0$ are set to 0, and when there is no indication signal of the first switch (9a) but there is an indication signal of a second switch (9b), only the flag $F_0$ is set to 1 and the flag $F_1$ is set to 0. When there are no indication signals of the first and second switches (9a and 9b) but there is an indication signal of a third switch (9c), only the flag $F_1$ is set to 1 and the flag $F_0$ is set to 0. When none of the first, second and third switches are turned on, the flags $F_1$ and $F_0$ maintain the previous values.

FIG. 3 shows the details of the indoor and outdoor air change-over processing in the microcomputer 6. The operation of the device will be explained below in accordance with the flow diagram showing this control program. In steps 300 and 301, the flags $F_1$ and $F_0$ are checked and decision is made as to which control mode has been assigned from the first, second and third switches (9a to 9c).

Then, when the second switch (9b) is turned on and the intake of indoor air is instructed, the flag $F_1$ is set to 1 so that an operation control signal is output to the actuator 8 to drive the indoor and outdoor air change-over damper in the indoor air intake state in a step 302. Meanwhile, when the third switch (9c) is turned on, the flag $F_0$ is set to 1 so that, in a step 303, the operation control signal to the actuator 8 is deenergized and the indoor and outdoor air change-over damper 2 is returned to the outdoor air inlet state. By turning on the second and third switches (9b and 9c), the indoor and outdoor air change-over damper 2 can be set to the desired air inlet mode.

Meanwhile, when the first switch (9a) is turned on and the automatic change-over mode is indicated or when none of the switches are turned on from the beginning, the indoor air inlet and the outdoor air inlet are automatically controlled in accordance with the output signal value of the gas sensor 4 by the processing in steps 304 through 310.

In the step 304, the output voltage Vs of the A/D converted gas sensor 4 is compared with the minimum value V min of the gas sensor. When Vs is smaller than V min, Vs is set to V min in the step 305. Since the first V min upon the power source being on has been set to the maximum value in the step 101, the first Vs becomes V min. Thereafter, through the steps 304 and 305, the minimum output value is stored in V min for the period from the time when the ignition is turned on, or when a voltage is applied to the gas sensor 4, to the time when it is turned off.

Subsequently in the step 306, a true output value $V_{OUT}$ of the sensor 4 corresponding to the impurity degree of the outdoor air is calculated and it is compared with predetermined values A and B (where A>B) in the steps 307 and 309. When the volume of polluted gas increases and exceeds the reference value A, the indoor and outdoor air change-over damper 2 is driven to the indoor air inlet state in the step 308. Meanwhile, when the volume of the polluted gas decreases and becomes smaller than the reference value B, the indoor and outdoor air change-over damper 2 is returned to the outdoor air inlet position in the step 310.

It should be noted that while the minimum value of the output level of the gas sensor is left in the A/D converted value in the above-described embodiment, the minimum value of the average level of the gas sensor within the time which is a reason for noise counter measures may be used as a reference level.

As described above, the present invention does not compare the output level of the gas sensor to be switched from the outdoor air inlet to the indoor air inlet with a completely fixed predetermined value, but sets the minimum value of the gas sensor output as a reference level produced during the period from the time when a voltage is applied to the gas sensor to the time when it is disconnected and compares this reference level with the output of the gas sensor, so that an indoor and outdoor air change-over control unit that can operate stably without any malfunction owing to the change of the temperature, humidity and time lapse of said gas sensor change.

What is claimed is:

1. An air-condition control apparatus for an automobile including an air conditioning unit in which the upstream side is selectively communicated to the outside or inside of the automobile compartment and the downstream side is communicated to the inside of the automobile compartment, an actuator for selectively taking in air from the outside of the compartment and from the inside of the compartment in said air conditioning unit, and a detector for generating an analog electrical signal in accordance with impurity components of air taken in from the outside of the compartment, wherein said air condition unit further comprises a control means for controlling said actuator in accordance with the electrical signal generated from said detector, said control means for producing a reference level from the minimum value of the detector output during the period of time when the detector is energized to the time when the detector is deenergized and comparing an output of said detector with said reference level, thereby fixing said actuator to a state of intaking air from the inside of the compartment when the compared differential value exceeds a first predetermined value and returning the actuator to a state of intaking air from the outside of the compartment when the compared differential value becomes smaller than a second predetemined value, the second predetermined value being set to be smaller than the first predetermined value.

2. An air-conditioning control apparatus according to claim 1 in which said control means includes an A/D converter converting into a digital signal the analog signal applied from said detector, a command switch providing a command signal indicative of indoor air circulation mode, outdoor air introduction mode and automatic selection mode of these two modes, and a microcomputer responsive to the command signal of said command switch and the digital signal from said A/D converter to produce a control signal for controlling said actuator.

3. An air-conditioning control apparatus according to claim 2 in which said microcomputer includes a main control routine having a timing process, an automatic air conditioning process and an indoor and outdoor air change over process.

4. An air-conditioning control apparatus according to claim 2 in which said microcomputer includes a timer interruption routine having a timer process, and a switching signal process.

5. An air-conditioning control apparatus according to claim 3 in which said indoor and outdoor air change over process includes a first step of producing a first control signal controlling the actuator to subject it to indoor air circulation mode when a first command signal is received, a second step of producing a second control signal controlling the actuator to subject it to outdoor air introduction mode when a second command signal is received, and a third step of producing a third control signal automatically controlling the actuator to selectively subject it to outdoor air introduction mode and indoor air circulation mode when a third command signal is received.

* * * * *